United States Patent
Bauer et al.

(10) Patent No.: US 7,703,909 B2
(45) Date of Patent: *Apr. 27, 2010

(54) INK SET AND MEDIA FOR INK-JET PRINTING

(75) Inventors: Stephen W. Bauer, San Diego, CA (US); Howard A. Doumaux, San Diego, CA (US); Tienteh Chen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/173,000

(22) Filed: Jul. 14, 2008

(65) Prior Publication Data

US 2008/0274339 A1 Nov. 6, 2008

Related U.S. Application Data

(63) Continuation of application No. 11/058,472, filed on Feb. 15, 2005, now Pat. No. 7,533,980.

(51) Int. Cl.
*G01D 11/00* (2006.01)
(52) U.S. Cl. .................. 347/100; 347/95; 106/31.6; 106/31.27; 106/31.13
(58) Field of Classification Search .......... 347/100, 347/95, 96, 101, 105, 88, 99; 106/31.6, 31.13, 106/31.27; 523/160
See application file for complete search history.

(56) References Cited

U.S. PATENT DOCUMENTS

| | | | |
|---|---|---|---|
| 5,476,746 A | 12/1995 | Janssens et al. | |
| 5,795,082 A | 8/1998 | Shimada et al. | |
| 6,245,421 B1 * | 6/2001 | Aurenty et al. | 428/32.18 |
| 6,419,355 B1 | 7/2002 | Bermel et al. | |
| 6,435,657 B1 | 8/2002 | Couwenhoven et al. | |
| 6,503,308 B2 | 1/2003 | Stramel et al. | |
| 6,655,784 B2 | 12/2003 | Kakutani | |
| 6,669,768 B2 | 12/2003 | Blease et al. | |
| 6,670,409 B2 | 12/2003 | Yatake | |
| 6,673,140 B2 | 1/2004 | Tyrell et al. | |
| 7,533,980 B2 * | 5/2009 | Bauer et al. | 347/100 |
| 2003/0088077 A1 | 5/2003 | Yamada et al. | |
| 2003/0106461 A1 | 6/2003 | Sano | |
| 2003/0146962 A1 | 8/2003 | Ogasawara et al. | |
| 2004/0216638 A1 | 11/2004 | Rolly | |
| 2004/0252162 A1 * | 12/2004 | Gondek et al. | 347/43 |

FOREIGN PATENT DOCUMENTS

| | | |
|---|---|---|
| EP | 0 732 219 A | 9/1996 |
| EP | 1 418 056 A | 5/2004 |
| EP | 1 486 543 A1 | 12/2004 |

OTHER PUBLICATIONS

European Search Report for EP Application No. 09 15 7748.6 dated Jun. 5, 2009 (6 pages).

* cited by examiner

*Primary Examiner*—Manish S Shah

(57) ABSTRACT

An ink set for ink-jet printing includes a medium cyan ink-jet ink, a magenta ink-jet ink, and a gray ink-jet ink. Each of the medium cyan ink-jet ink, the magenta ink-jet ink, and the gray ink-jet ink are configured to have a lightness at a predetermined/given number of drops per unit area of an image-receiving medium such that the lightness of each of the inks are substantially matched.

14 Claims, No Drawings

INK SET AND MEDIA FOR INK-JET PRINTING

CROSS-REFERENCE TO RELATED APPLICATIONS

This application is a continuation of U.S. application Ser. No. 11/058,472, filed Feb. 15, 2005, now U.S. Pat. No. 7,533,980 which is incorporated by reference herein in its entirety.

BACKGROUND

The present invention relates generally to ink-jet printing and more particularly to an ink set and media for ink-jet printing.

Ink-jet printing is a non-impact method for producing images by the deposition of ink droplets in a pixel-by-pixel manner to an image-recording medium in response to appropriate commands, such as digital signals.

To generate full color prints using ink-jet printing, ink sets having components of various colors and/or hues are used. Generally, ink sets having cyan, magenta, and yellow inks are utilized. In addition, a black ink is often added to enhance the printing of text and darker colors. Simple four-color systems like CMYK (cyan, magenta, yellow, and black) ink systems provide economical solutions for color printing. Systems incorporating six-inks or more have been developed to provide, in some instances, increased color gamut and finer grain characteristics than the four-ink systems. However, these systems may, in some instances increase metamerism, ink consumption, and/or printing complexity.

Further, to achieve high image quality, photo-base papers have typically been used as the substrate in print media. While photo-base papers provide high image quality, they may generally be more expensive than paper-base papers and may add to the overall cost of the print media. Furthermore, photo-base papers, in some instances, do not readily absorb the ink vehicle used in the ink-jet ink. Generally, a high coat-weight of an ink-receiving layer (e.g. greater than about 25 grams per square meter ("GSM")), may be necessary to absorb the ink vehicle. In addition, multiple layers may be used as the ink-receiving layer to separate the colorant from the ink vehicle to improve coalescence. Still further, images printed on photo-base paper may, in some instances have poor bleed characteristics and color fastness under humid conditions.

SUMMARY

Embodiment(s) of an ink set for use in ink-jet printing are disclosed herein. An embodiment of the ink set includes a medium cyan ink-jet ink, a magenta ink-jet ink, and a gray ink-jet ink. Each of the medium cyan ink-jet ink, the magenta ink-jet ink, and the gray ink-jet ink are configured to have a lightness at a predetermined number of drops per unit of an image-receiving medium such that the lightness of each of the inks are substantially matched.

DETAILED DESCRIPTION

Printed images that have a similar image quality to that of a photograph, are referred to herein as photographic quality images. A photographic quality image may include saturated colors, high gloss and gloss uniformity, freedom of grain and coalescence, and/or a high degree of permanence. To produce the photographic quality image, the inkjet ink and print medium should be compatible with one another. In addition, the ink-jet ink should have low puddling, good crusting resistance, good stability, high color gamut, low color-to-color bleed, and/or a rapid dry time. Further, the print medium used to print the photographic quality image should be fast drying and resist smearing, air, light, and moisture, while providing good color fidelity and high image resolution. Embodiment(s) of the ink set and media of the present invention advantageously substantially provide these properties.

Embodiment(s) of the ink set of the present invention may have a color gamut that substantially matches the color gamut for a silver halide (AgX) system, and thus may advantageously be a replacement for the AgX system. The ink set according to embodiments of the present invention may advantageously provide the color gamut scheme that the AgX system provides, including, but not limited to the blues, violets, magentas, reds, yellows, cyans, and greens. Further, embodiment(s) of the multi-colorant ink set system may be suitable for use in applications that include, but are not limited to ink-jet printing/photoprinting.

A non-limitative embodiment of the ink-set includes at least a medium cyan ink-jet ink, a magenta ink-jet ink, and a gray ink-jet ink. The medium cyan, gray and magenta inks may be formulated to provide essentially balanced dot visibility when administered on an image-recording medium. Still further, the inks may be configured to have substantially matched lightness.

It is to be understood that a "medium" cyan ink refers to a cyan ink having a dye loading less than commonly used for ink jet dark cyan inks, but greater than the amount commonly used for ink jet light cyan inks. The "medium" cyan ink is of sufficient dye concentration to achieve a minimum desired gamut (for example, AgX) without exceeding the maximum ink capacity of the intended media, but not necessarily achieving the maximum color gamut that the particular cyan dye is capable of achieving, thereby substantially eliminating the need for a dark cyan ink (e.g. conventional cyan). The dye concentration of the medium cyan is also low enough that the dot visibility is similar to that of the light magenta and light gray inks, thereby substantially eliminating the need for a light cyan ink.

It is to be understood that embodiment(s) of the ink set when applied to a media may advantageously provide a printed blend of color having a neutrality and a balanced fade such that if color(s) fade, they fade evenly; as such, the hue as printed remains substantially the same over time. It is to be understood that fade may be evaluated by monitoring the density of three color channels (e.g. cyan, magenta, and yellow). Balanced fade, as used herein, occurs when the density loss from a neutral color patch is similar across all three channels. Secondary colors produced from mixtures of two inks (e.g. red, green, and blue) will fade neutrally if the density of the two primary colors used to print the secondary colors fade similarly.

Further, the effects of the humid bleed phenomenon (e.g. colors migrating outward into other colored or unprinted areas) and/or the humid hue shift phenomenon (e.g. slight dye migration causing increased color to be realized from one or more of the inks printed in a certain area) may be substantially decreased and/or substantially eliminated with the ink set according to embodiment(s) of the present invention. It is to be understood that generally humid hue shift may occur primarily on photo media, while humid bleed may occur on both polymeric and porous media.

Embodiments of the ink set may advantageously have a lower ink consumption than a traditional six ink system (black (K), cyan (C), magenta (M), yellow (Y), light cyan (c), and light magenta (m)). Without being bound to any theory, it is believed that the combination of black and gray inks provides the inherent neutrality that a composite black (K) (generally using cyan, magenta and yellow to make gray) may not provide without closed loop color calibration. Still further, the usage of black and gray inks to darken colors, rather than using composite black, may also improve color gamut and metamerism.

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties necessary for effective ink-jet printing.

"Liquid vehicle" or "ink vehicle," as used herein, refers to the vehicle in which colorant is placed to form an ink. A wide variety of ink vehicles may be used with the compositions, systems, and methods according to embodiments of the present invention. Suitable ink vehicles may include, but are not limited to surfactants, solvents, co-solvents, buffers, biocides, sequestering agents, viscosity modifiers, surface-active agents, water, and/or mixtures thereof.

As used herein the term "ink-jet printing" refers to non-impact methods for producing images by deposition of ink droplets in a pixel-by-pixel manner to an image-recording medium in response to appropriate commands, such as digital signals. Various methods may be employed to control the deposition of ink droplets on the image-recording medium to form the desired and/or required image. For example, in drop-on-demand ink-jet printing, individual ink droplets are projected as needed onto the image-recording medium to form the desired and/or required image. Common methods of controlling the projection of ink droplets in drop-on-demand ink-jet printing include piezoelectric transducers and thermal bubble formation.

With this in mind, embodiment(s) of the present invention are drawn to ink-jet ink sets which may advantageously provide improved gamut, improved lightfastness, and a minimum number of inks, while maintaining good chroma, lightness, matched fade, neutrality, low grain, low ink usage, and/or reduction/substantial elimination of humid bleed. Certain dyes/colorants may be used in ink-jet inks that substantially improve the print quality of the printed images. It is contemplated that the these dyes may be used in multi-colorant ink sets having a cyan ink, a magenta ink, and a gray ink, in which the cyan, magenta, and gray inks may be configured and/or formulated to provide substantially the same dot visibility.

Further, an embodiment of the ink set includes gray, medium cyan, and magenta inks each having lightness ($L^*$) at a predetermined/given number of drops per unit area of the image-receiving medium such that the lightness of each of the inks are substantially matched. It is to be understood that the number of drops per unit area is to be determined for each ink prior to the deposition of the ink such that upon deposition, the lightness of the inks are substantially matched. In order to accomplish this, the inks may be tested at the same number of drops per unit area. However a higher or lower drop weight pen may require an inverse change in the number of drops per unit area. For example, a system using half the drop weight would likely use twice as many dots per unit area. The exact number of dots per unit area used for testing the system may be based on empirical matching to perceived dot visibility. It is desirable to have a sufficient number of drops to be able to reproducibly measure color without the drops touching each other. It is to be understood that if the drops touch, they may form a contiguous film, thus substantially eliminating the visibility of the individual drops. Therefore, in an embodiment, the $L^*$ is matched at the same number of drops per unit area for the different color inks.

"Lightness," as the term is used herein, refers to the $L^*$ value measured in CIELAB color space. For example, in the CIELAB color space (which allows the specification of color perceptions in terms of a three-dimensional space), the lightness, expressed as $L^*$, extends from zero (black) to 100 (white). It is to be understood that the attributes described herein may be described using other measurement systems (e.g. Munsell) that depict the color stimuli and performance characteristics discussed herein. Additionally, the terms $a^*$ and $b^*$, together, define the hue, where $a^*$ ranges from a negative number (green) to a positive number (red), and $b^*$ ranges from a negative number (blue) to a positive number (yellow). Alternative terms such as $h°$ (hue angle) and $C^*$ (chroma) may also be used to describe a given color.

In embodiment(s) of the ink set, the medium cyan ink, magenta ink, and gray ink may have respective lightness values ($L^*$) within a deviation of about ±5 of each another. More specifically, it is contemplated that $L^*$ for the magenta ink and the medium cyan ink may be within about ±5 of the $L^*$ of the gray ink. It is to be understood that $L^*$ deviations may be smaller, with deviations of about ±1 being desirable.

In a non-limitative embodiment, the medium cyan, magenta, and gray inks may have $L^*$ values ranging between about 65 and about 95. More specifically, the medium cyan, magenta, and gray inks may have $L^*$ values between about 80 and about 85. $L^*$ values discussed herein are measured at 279 drops per square millimeter with a drop size of 8 nanograms. It is to be understood that the $L^*$ values may be measured at any suitable parameters, including but not limited to drop weight, dot pattern, or dots per unit area.

It is to be understood that gray ink-jet inks, medium cyan ink-jet inks, and magenta ink-jet inks having matched lightness may be used in various ink sets that include additional inks selected to provide the desired and/or required characteristics (non-limitative examples of which include color gamut and color brightness). Thus, the ink set may include other ink(s) as desired and/or required. Examples of suitable additional ink-jet inks include, but are not limited to black, yellow, and/or dark magenta.

In a non-limitative example of the six-ink ink set of the present invention, the lightness $L^*$ values of the various ink are as follows: gray (k)=81.3, medium cyan (C)=83.3, light magenta (m)=82.7, yellow (Y)=93, black (K)=68.8, and magenta (M)=76.9. In this example, the lightness values are measured at 279 drops of 8 nanograms per square millimeter. However, it is to be understood that these $L^*$ values are to be considered illustrative and not limiting, as a change in system drop weight would give a different $L^*$ for the identical ink at the specified number of drops per square mm.

As disclosed herein, the selected gray ink-jet ink may exhibit color perception characteristics that are compatible with a selected black ink-jet ink such that noticeable differences at transition are minimized. The $L^*$ for the gray ink when deposited on an image-receiving media at the maximum desired amount or at the ink limit of the media may be essentially equivalent to the $L^*$ of a single dot of the black ink. In an embodiment, the black ink and the gray ink substantially define a neutral axis. Without being bound to any theory, it is believed that this may advantageously substantially decrease and/or eliminate grain during the transition from gray to black. In a non-limitative example, a hole may be formed in a field of gray ink, and a black drop may be inserted into that hole when the gray ink is present in its maximum amount and the $L^*$ of the gray ink substantially matches the $L^*$ of a single black drop. In this non-limitative example, the transition from gray to black may take place substantially without the visible perception of grain from the introduction of black dots.

In an embodiment of the ink set, six ink pens may be included. An embodiment of the six-pen ink set includes a subset having the gray ink-jet ink, the medium cyan ink-jet ink, and the magenta ink-jet ink having essentially matched lightness (L*) in addition to three other ink-jet inks (non-limitative examples of which include black, dark magenta, and yellow).

Each ink of the ink-set, particularly the six-ink ink sets, can produce substantially true colors on a variety of image-receiving media, including, but not limited to uncoated media, clay coated media, inorganic porous media, and gelatin coated media, each with improved lightfastness and gamut.

In the practice of embodiments of the present invention, each color of the ink set may be present in more than one ink, each having more than one dye load, for example. In an embodiment, there may be one or more ink-jet pens filled for each ink color, each pen having a different dye load, a different dye, different vehicle components, and/or different amounts of vehicle components, for example. In a non-limitative example, the ink set includes two magenta pens, each containing a different dye load and/or a different magenta dye.

The magenta, cyan and gray inks utilized in the ink subset disclosed herein may each be composed of suitable pigments, dyes and auxiliary materials necessary to provide deposition through a suitable ink-jet device onto an image-receiving medium. Similarly, it is contemplated that black and other auxiliary inks may be formulated to function with the magenta, medium cyan and gray inks. It is contemplated that the pigments, dyes and various auxiliary materials employed will be compositions formulated to provide characteristics approaching, equaling or exceeding the characteristics (non-limitative examples of which include gloss, gamut, durability, image quality and/or grain) achieved with silver halide (AgX) printing.

The choice of the colorants in the ink set described herein may be governed by characteristics including, among others, lightness, color gamut, humid bleed, printhead nozzle health, and/or the like. The color gamut of an ink set may be controlled primarily by the spectral absorption characteristics of the component dyes. In addition to the light absorption characteristics of the dyes, the maximum print density achieved from the ink is another important factor to provide a high color gamut. Thus, the materials may be chosen to provide appropriate print density.

Various cyan dyes/pigments and/or mixtures thereof may be used in the medium cyan ink. Non-limiting examples of medium cyan dyes include water soluble copper or nickel phthalocyanine dyes such as Direct Blue 86, Direct Blue 199, or Direct Blue 307, as well as Pigment Blue 15:3 or a derivative of aluminum phthalocyanine.

In an embodiment, various magenta dyes/pigments and/or mixtures thereof may be used in the magenta ink. Non-limiting examples of magenta dyes include water soluble azo dyes such as Direct Violet 107 or Reactive Red 31; water soluble transition metal complexes of an 8-heterocyclylazo-5-hydroxy quinoline, such as those described in U.S. Pat. Nos. 5,997,622 and 6,001,161, which are incorporated herein by reference in their entirety; anthrapyridone dyes such as those described in WO publication 01-18123, which is incorporated herein by reference in its entirety; Pigment Red 122; Acid Red (AR) 52 and AR 289.

It is contemplated that various gray dyes/pigments and/or mixtures thereof may be used in the gray ink. Non-limiting examples of gray dyes include passified reactive black 31, K1334 available from Ilford Imaging in Switzerland, Duasyn NB-SF (commercially available from Clariant located in Coventry, R.I.), Direct Black 168, Reactive Black 8, and acid black 52. It is to be understood that alone these dyes may not be sufficiently neutral, therefore blending one or more of them together (as described in U.S. Pat. No. 6,503,308, the specification of which is incorporated herein by reference in its entirety) and/or with cyan, magenta, and/or yellow dyes may be desired and/or necessary to achieve a desired neutral shade.

As indicated previously, a black ink may be incorporated in the ink set. The black ink of choice will be formulated in a manner such that it is compatible with the gray ink employed in the ink set. Gray/black compatibility may be determined by light fade and visibility. Ideally, a single dot of black ink present in a field of gray ink, both of which are deposited on an image-receiving medium, will be at least minimally perceptible.

It is contemplated that various black dyes/pigments and/or mixtures thereof may be used in the black ink. Non-limiting examples of the black dye are water soluble metal complex azo dyes such as Reactive Black 31 and Reactive Black 8, water soluble polyazo dyes such as Direct Black 19, Direct Black 195, and Direct Black 168, water soluble sulfur dyes such as Solubilized Sulfur Black 1, materials such as carbon black or derivatives of carbon black, and pRB31.

Some black dyes may be suitable for use in the black ink and the gray ink. Examples of such dyes include, but are not limited to Reactive Black 31, Duasyn-NB-SF, K1334, and Reactive Black 8.

Embodiment(s) of the ink set may also include inks of additional colors in order to match a silver halide gamut as desired and/or required. In one embodiment, a set having the medium cyan, magenta, gray, and black inks may also include a suitable yellow ink and a suitable dark magenta ink (generally having a darker hue/color than the other magenta ink).

Various yellow dyes/pigments and/or mixtures thereof may be used in the yellow ink. Non-limiting examples of yellow dyes include water soluble azo dyes as well as metal complex yellow dyes. Suitable water soluble azo dyes include, but are not limited to Direct Yellow 86, Direct Yellow 107, Direct Yellow 132, acid yellow 17, and acid yellow 23. Non-limiting examples of yellow pigments include Pigment Yellow 155 and Pigment Yellow 74. Other suitable yellow dyes include Y104, Y1189 (both of which are commercially available from Ilford Imaging located in Switzerland), and/or mixtures thereof.

It is to be understood that a blend of dyes having different colors may be used to form the various ink colors. For example, a light gray ink may have Duasyn-NB-SF (black dye), DJR-814 Na (magenta dye), and Y1189 (yellow dye). Still further, a magenta ink may have a combination of DJR-814 Na (magenta dye) and AR 52 Na (magenta dye). Non-limitative examples of blends of colors (and their corresponding UV absorbance) to form various gray and black dyes used in embodiments of the ink sets are incorporated into the following table.

TABLE 1

UV Absorbance values of Black (K) and Gray (k) ink formulations
(Dilution Ratio = 1 pigment:10,000 vehicle)

| Ingredients | K1 | K2 | K3 | k1 | k2 | k3 | k4 |
|---|---|---|---|---|---|---|---|
| DJR-814 Na | 0.01 | 0.013 | 0.01 | 0.0089 | 0.00445 | 0.0089 | 0.00445 |
| Y1189 | 0.01 | 0.007 | 0.01 | 0.00445 | 0.002225 | 0.002225 | 0.00445 |
| Duasyn NB-SF | 0.08 | 0.02 | 0.08 | 0.0267 | 0.0267 | 0.0267 | 0.0267 |

It is to be understood that the ink formulations may also include additional ingredients. Suitable additional ingredients include, but are not limited to those listed in Table 2, for example, ethylhydroxy-propanediol (EHPD); 2-pyrrolidone; 1,5 pentanediol; surfactants including, but not limited to those commercially available under the tradenames DOWFAX 2A 1 from Dow Chemical Co. located in Midland, Mich., SURFYNOL CT-111 from Air Products located in Allentown, Pa., and ZONYL FSA from Dupont located in Wilmington, Del.; buffers including, but not limited to commercially available under the tradename MOPS from Brinkmann located in Westbury, N.Y.; ethylenediaminetetraacetic acid (EDTA); and/or biocides including, but not limited to 1,2-benzisothiazolin-3-one (commercially available under the tradename PROXEL GXL from Zeneca AG Products, Inc. located in Wilmington, Del.; mixtures thereof; and/or the like.

TABLE 2

Additional Ingredients

| Composition Ingredient | % |
|---|---|
| EHPD | 12 |
| 2-Pyrrolidone | 6.5 |
| 1,5 Pentanediol | 2 |
| Dowfax 2A1 | 0.32 |
| Surfynol CT-111 | 0.16 |
| Zonyl FSA | 0.8 |
| MOPS | 0.05 |
| EDTA, di Na | 0.01 |
| PROXEL GXL | 0.2 |
| Balance: water and dyes | |

It is contemplated that printing procedures employing the ink set utilizing the medium cyan, magenta, gray, and black inks will have a neutral axis defined solely using the black and gray inks. Additionally, darkening of any colors may be done with black and gray. Traditional ink sets generally define the neutral axis using a composite black ink or pure black ink. A pure black ink may, in some instances, be very grainy. A composite black (mixing cyan, magenta, and yellow on paper) may, in some instances, be difficult to control, especially as more inks are added and/or across media without having closed loop color calibration. Further, when printing black and white with a 3 ink system (CMY) dark areas require a lot of ink, generally flooding the media with resulting loss of detail, particularly in shadowed areas. Gray inks are able to print a black and white/gray scale with outstanding definition and clarity, because less ink is required to get the same image.

Flesh tones, where deposited, may be defined by a combination that includes light magenta, cyan, and gray inks, substantially without appreciable presence of cyan ink. In ink systems using composite black, cyan and light cyan inks may be used to reduce chroma of oranges and to modulate L* for creating flesh tones. However, in some instances, these cyan ink dots may look grainy. Without being bound to any theory, it is believed that embodiments of the ink set of the present invention including the gray ink substantially eliminate and/or reduce usage of the cyan ink in flesh tones, and thus substantially eliminate the grainy look. As used herein, "appreciable presence" is taken to mean incidence of a color or pigment (e.g. cyan) at a level greater than random. For example, the amount of cyan ink used may be limited to an amount smaller than the amount of gray ink used. Thus, while an incidental drop of dark magenta may be tolerated in the flesh region, it is contemplated that no appreciable levels of dark cyan are present and/or may be detected or perceived.

Under humid conditions, in normal 3-ink CMY and 6-ink CMYcmk printing, humid hue shift is a problem—dye in ink drops that are placed adjacent to each other may migrate, shifting the neutral and gray areas to the color of the dye that migrates fastest. For certain inks, this gives a red shift to neutral and skintone areas of images. In the inks of the present invention, the dyes are intimately mixed in the ink and on the media so color shift due to dye migration under humid conditions is greatly reduced. In a typical 6-ink printing system, gray and neutral areas are a product of CMY and cmk inks. Usually multiple pens are used to deliver inks in 6-ink systems. There is often a dropweight variation between pens, and even though this is minimized, it may not generally be completely eliminated. The result is that neutral and skintone areas of images printed using 6-ink CMYcmk are often color shifted or producing an off hue. When a pen having the inks of the current invention are used there are substantially few, if any problems with the hue shift in neutral areas. The resulting images are thus rendered more accurately.

One embodiment of a six-pen ink set uses medium cyan (C), dark magenta (M), light magenta (m), yellow (Y), black (K), and gray (k) inks. In this embodiment, generally the light colored inks include, but are not limited to, the medium cyan, the light magenta, the gray, and the yellow, while the dark colored inks include, but are not limited to black and dark magenta. It is to be understood that the "dark" inks may have a "light" ink version in order to reduce grain.

The dye loads utilized may be as follows: medium cyan having a dye load sufficient to provide visible absorbance at peak maxima ranging between about 0.01 and about 0.10 at a 1:10,000 dilution of dye:vehicle; light magenta having a dye load sufficient to provide visible absorbance at peak maxima ranging between about 0.01 and about 0.06 at a 1:10,000 dilution of dye:vehicle; yellow having a dye load sufficient to provide visible absorbance at peak maxima ranging between about 0.01 and about 0.2 at a 1:10,000 dilution of dye:vehicle; gray having a dye load sufficient to provide visible absorbance at peak maxima ranging between about 0.001 and about 0.05 at a 1:10,000 dilution of dye:vehicle; dark magenta having a dye load sufficient to provide visible absorbance at peak maxima ranging between about 0.02 and about 0.5 at a 1:10,000 dilution of dye:vehicle; and black having a dye load sufficient to provide visible absorbance at peak maxima ranging between about 0.02 and about 0.75 at a 1:10,000 dilution of dye:vehicle.

It is to be understood that the visible absorbance at peak maxima for the various colored inks occurs between about 375 nm and about 700 nm on the visible spectrum. It is to be further understood that the black ink absorbance may occur anywhere on the visible spectrum. Still further, the absorbance at peak maxima may be used to specify the dye load for a particular ink.

In embodiment(s) of the ink set of the present invention, the ratio of dye loads of the dark and light inks at a 1:10,000 dilution of dye:vehicle may range between about 2:1 and about 5:1, dark ink to light ink, depending, in part, on the printing apparatus used. For example, if a yellow ink has a dye load sufficient to provide UV absorbance of 0.2 at a 1:10,000 dilution of dye:vehicle; then a black ink may have a dye load sufficient to provide UV absorbance ranging between about 0.4 and about 1 at a 1:10,000 dilution of dye:vehicle. In another embodiment, the ratio of dye loads of the dark and light inks at a 1:10,000 dilution of dye:vehicle may be about 3:1.

In an alternate embodiment, the dye loads may be as follows: medium cyan having a dye load sufficient to provide visible absorbance at peak maxima ranging between about 0.047 and about 0.057 at a 1:10,000 dilution of dye:vehicle; light magenta having a dye load sufficient to provide visible absorbance at peak maxima ranging between about 0.027 and about 0.033 at a 1:10,000 dilution of dye:vehicle; yellow having a dye load sufficient to provide visible absorbance at peak maxima ranging between about 0.09 and about 0.11 at a 1:10,000 dilution of dye:vehicle; gray having a dye load sufficient to provide visible absorbance at peak maxima ranging between about 0.024 and about 0.029 at a 1:10,000 dilution of dye:vehicle; dark magenta having a dye load sufficient to provide visible absorbance at peak maxima ranging between about 0.072 and about 0.088 at a 1:10,000 dilution of dye:vehicle; and black having a dye load sufficient to provide visible absorbance at peak maxima ranging between about 0.072 and about 0.088 at a 1:10,000 dilution of dye:vehicle.

In a specific non-limiting example of an embodiment of the six-pen ink set, the dye loads are sufficient to provide the following visible absorbance at peak maxima for each of the inks at a 1:10,000 dilution of ink to vehicle: medium cyan=0.052; dark magenta=0.08; light magenta=0.03; yellow=0.10; black=0.08; and gray=0.0267.

It is contemplated that the medium cyan employed in the six-pen ink set may have sufficient chroma to match and/or exceed the silver halide gamut in fully saturated cyans, blues and greens while providing a dot visibility essentially equivalent to that of light magenta and gray. At certain dye loads (e.g. those indicated above), the medium cyan may match the dot visibility of the light magenta and the gray, thus providing an ink system that is well balanced for dot visibility and grain.

Embodiment(s) of the ink set of the present invention may be used in, but are not limited to being used in the follow devices: ink cartridges having tanks/reservoirs accommodating each of the inks; recording units having tanks/reservoirs housing each of the inks and ink-jet heads for discharging the respective inks; ink systems; and printing systems adapted to detachably attach ink cartridges having the inks therein. It is to be understood that ink cartridges may further include a storage device adapted to store information regarding a quantity of ink in each of the ink tanks/reservoirs in a readable, write-able, and/or volatile manner.

An ink-jet recording/printing method utilizing embodiments of the ink sets include first preparing the desired ink set (e.g. a six-pen ink set). The recording/printing methods may be used for forming text or images on an image-recording/receiving medium. The method further includes preferentially depositing dark color inks (e.g. black and/or dark magenta) on the image-recording medium. Additionally, light color inks (e.g. light magenta, medium cyan, yellow, and gray) are preferentially deposited on the image-recording medium.

In an alternate embodiment of the method, a printer that is responsive to digital data signals is loaded with an ink-jet recording medium having an image-receiving layer thereon. The printer may also be loaded with an embodiment of the ink set (e.g. an ink set housed in an ink cartridge). In response to the digital data signals, the printer dispenses the ink-jet inks form the ink set onto the image-recording medium.

The above embodiments are provided to set forth some examples. Those skilled in the art will appreciate modifications that are also within the scope of embodiments of the present invention. A typical formulation for an ink useful in the practice of this invention may include a dye, present at dye loads in the ranges described hereinabove; one or more solvents or co-solvents, present in an amount ranging between about 5 wt. % and 30 wt. %, and one or more non-ionic, cationic, and/or anionic surfactants, present in an amount ranging between about 0.001 wt. % and about 10 wt. %, for example. The balance of the formulation may be water (e.g. purified water), or other vehicle components such as biocides, viscosity modifiers, materials for pH adjustment, sequestering agents, preservatives, and/or the like.

It is to be understood that embodiments of the present invention may be practiced using other inkjet printing methods/inks. These include, but are not limited to UV-curable inks which may have a composition of greater than about 90% reactive solvents and polymeric binders, and glycol-based, "ECO-solvent," ink formulations. Typical solvent concentrations for the glycol-based ink formulations may range up to about 70%.

Classes of solvents/co-solvents include, but are not limited to aliphatic alcohols, aromatic alcohols, diols, glycol ethers, polyglycol ethers, caprolactams, formamides, acetamides, long chain alcohols and/or mixtures thereof. Specific non-limiting examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific non-limiting examples of solvents include trimethylolpropane, 2-pyrrolidinone, and 1,5-pentanediol.

One or more of many surfactants may also be used in the ink formulations. Suitable non-limiting examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and mixtures thereof.

Various other additives may be employed to optimize the properties of the ink composition for specific applications. Examples of these additives are those added to inhibit the growth of harmful microorganisms. These additives may be biocides, fungicides, and other microbial agents, which may be routinely used in ink formulations. Examples of suitable microbial agents include, but are not limited to, commercially available NUOSPET (Nudex, Inc.), UCARIDE (Union Carbide Corp. located in Houston, Tex.), VANCIDE (R. T. Vanderbilt Co. located in Norwalk, Conn.), PROXEL (ICI America), and mixtures thereof.

Sequestering agents such as EDTA (ethylene diamine tetra acetic acid) may be included to eliminate the deleterious effects of heavy metal impurities; and buffer solutions may be used to control the pH of the ink. Viscosity modifiers and buffers may also be present, as well as other additives to modify properties of the ink as desired. Such additives may be present in an amount ranging between about 0.0001 wt. % and about 1 wt. %.

Suitable image-recording media include a substrate. Non-limiting examples of suitable substrate materials include paper, photo-based porous media, photo-based swellable media, polymeric materials (non-limitative examples of which include polyester white film or polyester transparent film), photopaper (non-limitative examples of which include polyethylene or polypropylene extruded on one or both sides of paper), metals, and/or mixtures thereof.

In an embodiment, the image-recording media may be a photo-based swellable media including a swellable or polymeric ink receiving layer. The ink receiving layer may include a water soluble polymer, cationic colloidal silica, and dye mordant(s).

More specifically, the water soluble polymer may include, but is not limited to, polyvinyl alcohol ("PVOH"), a copolymer of polyvinylalcohol with polyethyleneoxide, a copolymer of polyvinylalcohol with polyacrylic or maleic acid, acetoacetylated polyvinylalcohol, polyvinylalcohol with quaternary ammonium functional groups, a copolymer of polyvinylalcohol-polyvinylamine, and/or mixtures thereof. In an embodiment, the water soluble polymer is PVOH, a modified PVOH, or a mixture of PVOH compounds. The modified PVOH may be formed by cationic or anionic modifications to the end of the PVOH molecule. These PVOH compounds are available from numerous sources, such as Kuraray Specialties Europe GmbH (Frankfurt, Germany) and Nippon Gohsei (Osaka, Japan). The PVOH may be partially or completely saponified, having a saponification ratio ranging between about 70% and about 100%. In an embodiment, the saponification ratio is at least about 80%. For optimum coalescence, a mixture of PVOH compounds having about 80% to about 90% hydrolysis may be used in the ink-receiving layer.

In an embodiment including more than one compound from more than one class of water soluble polymers (e.g. PVOH and polyvinyl pyrrolidone) in the ink receiving layer, PVOH may be present as a major component of the mixture. For example, the PVOH may be present in the mixture in an amount ranging between about 80% and about 95%.

Examples of other water soluble polymers that may be used include, but are not limited to copolymers of polyvinylpyrrolidone with polyvinylacetate, polyacrylamide, polyethylene oxide, hydroxyethyl cellulose, hydroxypropylmethyl cellulose, poly(N-ethyl-2-oxazoline), casein, starch, agar, carrageenan, polymethacrylamide, cellulose, carboxymethyl cellulose, dextran, pullulan, gelatin and derivatives thereof, and/or mixtures thereof.

In an embodiment, the water soluble polymer is present in the ink receiving layer in an amount ranging between about 20 wt. % and about 95 wt. %.

The ink receiving layer further includes an amount of a cationic colloidal silica. It is to be understood that the cationic colloidal silica may advantageously improve the dot gain of the media and the black optical density of the disposed ink. It is to be further understood that the cationic colloidal silica may be fine particles, generally ranging between about 5 nm and about 100 nm in diameter. In an embodiment, the cationic colloidal silica particles have a size ranging between about 5 nm and about 20 nm. In a further embodiment, the size of the cationic colloidal silica ranges between about 7 nm and about 15 nm. The shape of the silica may have any suitable geometry. The shapes may all be the same geometry, a similar geometry, or a mix of geometries, including regular and/or non-regular geometries. Some non-limitative examples of these shapes include, but are not limited to particles, spheres, cylinders, cubes, and/or cones. In an embodiment, the cationic colloidal silica has a spherical shape.

The cationic colloidal silica may be aluminum treated and/or organic treated. Examples of cationic colloidal silica include, but are not limited to those commercially available under the tradenames LUDOX CL and LUDOX TMA from DuPont located in Wilmington, Del.; SNOWTEX ST-O, SNOWTEX ST-OL, and SNOWTEX PS from Nippon Chemicals located in Toyko, Japan; and CARTACOAT K-303H, CARTACOAT 302C, and CARTACOAT 303C from Clariant Chemicals located in Coventry, R.I. It is to be understood that the Zeta potential of the cationic colloidal silica may be at least 10 mv or higher at pH of about 3.5.

In an embodiment, the amount of cationic colloidal silica in the ink receiving layer may be up to about 20 wt. % of the total formulation, and more preferably ranges between about 2 wt. % and about 15 wt. %.

The ink receiving layer further includes a dye mordant(s). The mordant used may be a water soluble compound that does not interact with the water soluble polymer or any cross-linking agent(s). It is to be understood that the mordant should not adversely impact the printing process. It is to be further understood that the total amount of dye mordant in the ink receiving layer ranges between about 2 wt. % and about 20%. In a non-limitative embodiment, the dye mordant ranges between about 5 wt. % and about 15 wt. % of the ink receiving layer.

In an embodiment, the mordant(s) may be a cationic polymer, such as a polymer having a primary amino group, a secondary amino group, a tertiary amino group, a quaternary ammonium salt group, or a quaternary phosphonium salt group. The mordant may be in a water soluble form or in a water-dispersible form, such as in latex. In an embodiment, the mordants are made by free-radical polymerization of a hydrophobic addition monomer and a cationic addition monomer. In an embodiment, the ratio of hydrophobic addition monomer to cationic addition monomer ranges between about 95:5 and about 50:50.

Non-limitative examples of hydrophobic addition monomers include $C_1$-$C_{12}$ alkyl acrylates and methacrylates (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, and tert-butyl methacrylate); aromatic monomers (e.g., styrene, phenyl methacrylate, o-tolyl methacrylate, m-tolyl methacrylate, p-tolyl methacrylate, and benzyl methacrylate); hydroxyl containing monomers (e.g., hydroxyethylacrylate, hydroxyethylmethacrylate); carboxylica containing monomers (e.g., acrylic acid, methacrylic acid); vinyl ester monomers (e.g., vinyl acetate, vinyl propionate, vinylbenzoate, vinylpivalate, vinyl-2-ethylhexanoate, and vinylversatate); $C_1$-$C_{12}$ alkyl acrylamides and methacrylamides (e.g., t-butyl acrylamide, sec-butyl acrylamide, and N,N-dimethylacrylamide); crosslinking monomers (e.g., divinyl benzene, ethyleneglycoldimethacrylate, and bis(acryloylamido)methylene); and mixtures thereof. In one embodiment, the hydrophobic addition monomers include alkyl acrylates, alkyl methacrylates, vinyl esters, styrene derivatives, and/or mixtures thereof.

Suitable examples of cationic addition monomers containing amine or quaternary ammonium functional groups include, but are not limited to, N-(2-aminoethyl)methacrylamide, N-(2-aminoethyl)acrylamide, N-(3-aminopropyl) methacrylamide, N-(3-aminopropyl)acrylamide, p-vinylbenzylamine, m-vinylbenzylamine, methylaminoethyl methacrylate, ethylaminoethyl methacrylate, n-propylaminoethyl methacrylate, isopropylaminoethyl methacrylate, n-butylaminoethyl methacrylate, sec-butylaminoethyl methacrylate, isobutylaminoethyl methacrylate, tert-butylaminoethyl methacrylate, methylaminoethyl acrylate, ethylaminoethyl acrylate, n-propylaminoethyl acrylate, isopropylaminoethyl acrylate, n-butylaminoethyl acrylate, sec-butylaminoethyl acrylate, isobutylaminoethyl acrylate, tert-butylaminoethyl acrylate, methylaminopropyl methacrylate, ethylaminopropyl methacrylate, n-propylaminopropyl methacrylate, isopropylaminopropyl methacrylate, n-butylaminopropyl methacrylate, sec-butylaminopropyl methacrylate, isobutylaminopropyl methacrylate, tert-butylaminopropyl methacrylate, methylaminopropyl acrylate, ethylaminopropyl acrylate, n-propylaminopropyl acrylate, isopropylaminopropyl acrylate, n-butylaminopropyl acrylate, sec-butylaminopropyl acrylate, isobutylaminopropyl acrylate, tert-butylaminopropyl acrylate, N-(methylaminoethyl)methacrylamide, N-(ethylaminoethyl)methacrylamide, N-methyl-N-(p-vinylbenzyl)amine, N-methyl-N-(m-vinylbenzyl)amine, N-ethyl-N-(p-vinylbenzyl)amine, N-ethyl-N-(m-vinylbenzyl)amine, dimethylaminoethyl methacrylate, diethylaminoethyl methacrylate, dimethylaminoethyl acrylate, diethylaminoethyl acrylate, dimethylaminopropyl methacrylate, diethylaminopropyl methacrylate, N-(dimethylaminoethyl)methacrylamide, N-(diethylaminoethyl) methacrylamide, N-(dimethylaminoethyl)acrylamide, N-(diethylaminoethyl)acrylamide, N-(dimethylaminopropyl)methacrylamide, N-(diethylaminopropyl)methacrylamide, N-(dimethylaminopropyl)acrylamide, N-(diethylaminopropyl)acrylamide, N-ethyl-N-methylaminoethyl methacrylate, N-ethyl-N-methylaminopropyl acrylate, N,N-dimethyl-N-(p-vinylbenzyl)amine, N,N-dimethyl-N-(m-vinylbenzyl)amine, N,N-diethyl-N-(p-vinylbenzyl)amine, N,N-diethyl-N-(m-vinylbenzyl)amine, N-ethyl-N-methyl-N-(p-vinyl benzyl)amine, and mixtures thereof.

In addition, the amines may include the quaternary salts derived from these amine monomers such as, but not limited to, 4-vinylbenzyltrimethylammoniumchloride, methyl-2-(methacryloyloxy)ethylammonium salt, ethyl-2-(methacryloyloxy)ethylammonium salt, n-propyl-2-(methacryloyloxy) ethylammonium salt, 2-(methacryloylamino) ethylammoniumchloride salt, 2-(acryloylamino) ethylammoniachloride salt, 3-(methacryloylamino) propyl ammoniumchloride salt, methyl-p-vinylbenzylammonium salt, methyl-m-vinylbenzylammonium salt, ethyl-p-vinylbenzylammonium salt, ethyl-m-vinylbenzylammonium salt, trimethyl-2-(methacryloyloxy)ethylammonium salt, triethyl-2-(methacryloyloxy)ethylammonium salt, trimethyl-2-(acryloyloxy)ethylammonium salt, and triethyl-2-(acryloyloxy) ethylammonium salt. Examples of ultrafine cationic addition monomers include those commercially available under the tradenames TRUDOT P-2604, P-2606, P-2608, P-2610, P-2630, and P-2850 from MeadWestvaco Corp. located in Stamford, Conn.; RHOPLEX® PRIMAL-26 from Rohm and Haas Co. located in Philadelphia, Pa.; and B34 cationic polymers from PPG located in Springdale, Pa.

In an embodiment, the size of the cationic addition polymer ranges between about 10 nm and about 200 nm. Examples of suitable mordants are shown in Table 3.

TABLE 3

Dye Mordants

| | Monomer Composition | Particle Size |
| --- | --- | --- |
| 1 | Styrene (60%)<br>Ethyl Acrylate (30%)<br>Trimethylaminoethylacrylate methylsulfate salts (10%) | 115 nm |
| 2 | Methylmethacrylate (50%)<br>Ethyl Acrylate (30%)<br>Trimethylaminoethylacrylate methylsulfate salts (20%) | 118 nm |
| 3 | Styrene (50%)<br>n-Butyl Acrylate (30%)<br>Trimethylaminoethylacrylate chloride salts (20%) | 120 nm |
| 4 | Styrene (50%)<br>n-Butyl Acrylate (30%)<br>(3-acrylamidopropyl) trimethyl ammonium chloride (20%) | 110 nm |
| 5 | t-Buylacrylamide (50%)<br>n-Butyl Acrylate (30%)<br>(3-acrylamidopropyl) trimethyl ammonium chloride (20%) | 98 nm |
| 6 | t-Butyl methacrylate (50%)<br>2-Hydroxyethylacylate (10%)<br>n-Butyl Acrylate (20%)<br>(3-acrylamidopropyl) trimethyl ammonium chloride (20%) | 130 nm |

The ink receiving layer may optionally include additional minor additives of water soluble cationic polymers. Non-limitative examples of such polymers include polyethyleneimines; polyallylamines; polyvinylamines; a dicyandiamide-polyalkylenepolyamine condensate; a polyalkylenepolyamine-dicyandiamideammonium condensate; a dicyandiamide-formalin condensate; a polymer of epichlorohydrin-dialkylamine; a polymer of diallyldimethylammoniumchloride ("DADMAC"); a copolymer of diallyldimethylammoniumchloride-$SO_2$; polyvinylimidazole; polyvinypyrrolidone; a copolymer of vinylimidazole; polyamidine; chitosan; cationized starch; polymers of vinylbenzyl-trimethylqammoniumchloride; (2-methacryloyloxyethyl)trimethyl-ammoniumchloride; polymers of dimethylaminoethylmethacrylate; a polyvinylalcohol with a pendant quaternary ammonium salt; and/or mixtures thereof.

The coat-weight of the ink receiving layer may be up to about 35 GSM, even for photo base paper. In an embodiment, the coat-weight of the ink receiving layer ranges between about 15 GSM and about 35 GSM. The humid fastness (bleed and color shift) is substantially eliminated by embodiments of the media, especially when combined with embodiments of the ink set. Without being bound to any theory, it is believed this is due in part to the specific combination of water soluble polymers and water dispersible cationic polymers in the ink receiving layer.

To further illustrate embodiment(s) of the present invention, the following examples are given. It is to be understood that this example is provided for illustrative purposes and is not to be construed as limiting the scope of embodiment(s) of the present invention.

EXAMPLE 1

|  | UV Absorbance | | | | |
|---|---|---|---|---|---|
| Ingredient | C | M | M | Y | K | k |
| DB-199 Na | 0.052 | | | | | |
| DJR-814 Na | | 0.04 | 0.02 | | 0.01 | 0.00445 |
| AR52 Na | | 0.04 | 0.01 | | | |
| Y1189 | | | | 0.1 | 0.01 | 0.002225 |
| Duasyn NB-SF | | | | | 0.08 | 0.0267 |
| Water and solvents per Table 2 composition | | | | | | |

In this example, the cyan, light magenta and gray inks have very similar dot visibility, while the yellow has less and the black and magenta have considerably more. The black and magenta inks have noticeably darker L*. The medium cyan has an L* value similar to the gray and light magenta and hence no light cyan was required. It is to be understood that a conventional cyan would have been darker (more dye) in order to enable sufficient gamut across a wide range of media. The present inventors were able to make embodiments of the inventive ink set by incorporating a single medium cyan sufficient to achieve the desired gamut and dot visibility, while eliminating the need for a dark cyan ink which achieves the target at the ink limit of the media used.

EXAMPLE 2

The following is an example of various formulas for the swellable ink receiving layer, which may be disposed on a substrate to form embodiments of the media.

| | Formulation ID | | | | | | |
|---|---|---|---|---|---|---|---|
| Chemical | M1 | M2 | M3 | M4 | M5 | M6 | M7 M5 w/Ludox Washout |
| Mowiol 15-79 | 50 | 50 | 100 | 0 | 50 | 40 | 50 |
| Mowiol 18-88 | 50 | 50 | 0 | 100 | 50 | 50 | 50 |
| PVP K-15 | 0 | 0 | 0 | 0 | 0 | 10 | 0 |
| Ludox CL | 10 | 10 | 10 | 10 | 10 | 10 | 10 |
| B-34 (WC-99) | 10 | 0 | 5 | 5 | 5 | 5 | 5 |
| Boric Acid | 2.5 | 2.5 | 2.5 | 2.5 | 2.5 | 2.5 | 2.5 |
| Silwet L-7210 | 0.50% | 0.50% | 0.50% | 0.50% | 0.50% | 0.50% | 0.50% |

In this example, Mowiol 15-79 and Mowiol 18-88 are polyvinylalcohol manufactured by Clariant Chemical Company located in Coventry, R.I. PVP K-15 is polyvinylpyrrolidone manufactured by ISP chemicals. Ludox CL is the tradename that is commercially available from DuPont located in Wilmington, Del. B-34 is cationic polymers from PPG located in Springdale, Pa. Silwet L-7210 is a siloxane-polyethylene oxide copolymer from GE silicones.

While several embodiments have been described in detail, it will be apparent to those skilled in the art that the disclosed embodiments may be modified. Therefore, the foregoing description is to be considered exemplary rather than limiting.

What is claimed is:

1. A six-pen ink set for ink-jet printing, comprising:
   a magenta ink-jet ink having a colorant load capable of providing a visible absorbance at peak maxima between about 0.01 and about 0.06 at a 1:10,000 dilution of colorant to water;
   a gray ink-jet ink having a colorant load capable of providing a visible absorbance at peak maxima between about 0.001 and about 0.05 at a 1:10,000 dilution of colorant to water;
   a medium cyan ink-jet ink having a colorant load capable of providing a visible absorbance at peak maxima between about 0.01 and about 0.10 at a 1:10,000 dilution of colorant to water;
   a black ink-jet ink having a colorant load capable of providing a visible absorbance at peak maxima between about 0.02 and about 0.75 at a 1:10,000 dilution of colorant to water;
   a second magenta ink-jet ink having a colorant load capable of providing a visible absorbance at peak maxima between about 0.02 and about 0.5 at 1:10,000 dilution of colorant to water; and
   a yellow ink-jet ink.

2. The six-pen ink set of claim 1 wherein the colorants in the inks comprise pigments.

3. The six-pen ink set as defined in claim 1 wherein the inks are configured to have a balanced fade when deposited on a medium.

4. The six-pen ink set as defined in claim 1 wherein the inks are adapted to at least one of substantially reduce and eliminate at least one of humid bleed and humid hue shift when deposited on a medium.

5. The six-pen ink set for as defined in claim 1 wherein said peak maxima absorbances are measured in a spectrophotometer having a sample cell with an optical path length of 1.0 centimeter.

6. The six-pen ink set of claim 1 wherein said black and gray inks have a fade resistance approximately equal to said cyan, magenta, and yellow inks when printed on a medium.

7. An inkjet printing system, comprising:
   an ink set as defined in claim 1,
   a porous medium; and
   a plurality of two-color printheads configured to contain said inks and deposit said inks on said porous medium.

8. An image obtained by depositing at least one of said inks of claim 1 on a printing medium.

9. The image as defined in claim 7 wherein the printing medium is a porous medium.

10. An ink cartridge comprising a plurality of ink tanks accommodating the inks of the six-pen ink set defined in claim 1.

11. A method for printing an image on a recording medium, comprising:
   preferentially depositing dark color inks from the six-pen ink set as defined in claim 1 on the recording medium, the dark color inks including the black ink-jet ink and the second magenta ink-jet ink; and
   preferentially depositing light color inks from the six-pen ink set as defined in claim 1 on the recording medium, the light color inks including the magenta ink-jet ink, the gray ink-jet ink, the medium cyan ink-jet ink, and the yellow ink-jet ink.

12. The method as defined in claim 11 wherein the magenta ink-jet ink, the medium cyan ink-jet ink, and the gray ink-jet ink are configured to have a lightness at a given number of drops per unit area of the recording medium such that the lightness of each of the inks is substantially matched.

13. The method as defined in claim 11 wherein the medium cyan ink-jet ink substantially matches a dot visibility of the gray ink-jet ink and the magenta ink-jet ink.

14. The method as defined in claim 11 wherein a neutral axis is defined by deposition of the black ink-jet ink and the gray ink-jet ink.

\* \* \* \* \*